Figure 4:
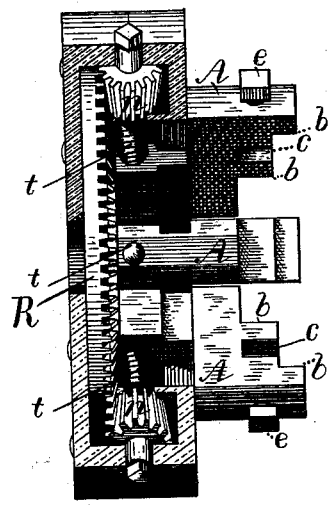

(No Model.) 2 Sheets—Sheet 1.
W. L. SWEETLAND.
LATHE CHUCK.
No. 347,395. Patented Aug. 17, 1886.
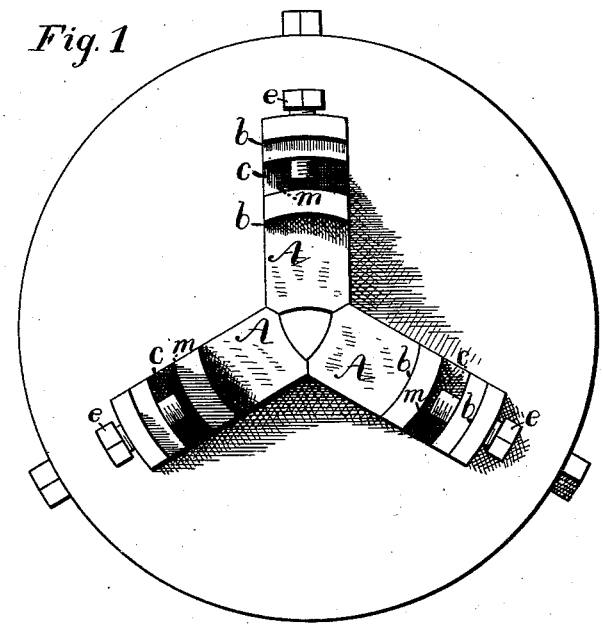
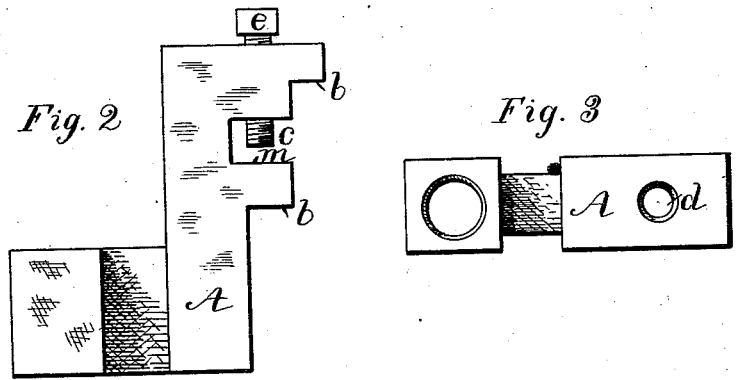
WITNESSES:
Geo. L. Barnes.
David K. Andrews.
INVENTOR
Wm L. Sweetland
BY Julius Twiss,
ATTORNEY.

(No Model.)  2 Sheets—Sheet 2.

W. L. SWEETLAND.
LATHE CHUCK.

No. 347,395.  Patented Aug. 17, 1886.

WITNESSES:
George L. Barnes
Edwin C. Dow

INVENTOR
Wm L Sweetland
BY Julius Twiss,
ATTORNEY

UNITED STATES PATENT OFFICE.

WILLIAM L. SWEETLAND, OF NEW HAVEN, CONNECTICUT.

LATHE-CHUCK.

SPECIFICATION forming part of Letters Patent No. 347,395, dated August 17, 1886.

Application filed December 18, 1885. Serial No. 186,085. (No model.)

*To all whom it may concern:*

Be it known that I, WILLIAM L. SWEETLAND, a citizen of the United States, residing at New Haven, in the State of Connecticut, have invented a new and useful Improvement in Clamp-Jaws for Lathe-Chucks, of which the following is a specification.

My invention relates to a clamp-jaw for lathe-chucks, and has for its object to provide a device for holding pulleys or other thin cylindrical work without crushing or straining action thereon.

The improvement consists in novel recessed jaw and clamping-screw, as hereinafter more fully described and claimed.

In the drawings, Figure 1 is a view of a chuck fitted with my improved clamp-jaws. Fig. 2 is a side view of one of the jaws detached, and Fig. 3 is a plan view of the same. Fig. 4 is a sectional view on the line of two of the chuck-jaws, showing the means by which the jaws are operated conjointly.

Referring to the drawings, A designates a lathe-chuck jaw having the usual steps, *b b*. A transverse notch or recess, C, is formed in the face of the jaw between the two steps *b b*. The recess is made sufficiently deep and wide to receive the rim of a pulley or corresponding cylindrical work. A radial perforation, *d*, extends through the outer part of the jaw into the recess, and is threaded to receive a set-screw, *e*. The set-screw is sufficiently long to reach the interior surface or seat of the recess *m*, and is adapted to clamp the work against the seat. Each of the chuck-jaws is provided with the recess and clamping-screw, and all are of similar and uniform proportions. The jaws are arranged in the chuck in the usual manner, and are moved uniformly toward and from the center by means of a circular rack, R, which intermeshes with suitable pinions, *n*, on the screws *t* of the jaw. Therefore when any one of the screws are turned the other screws and the rack turn correspondingly, and the jaws slide conjointly toward and from the center. The recesses are therefore always equidistant from the axis of the chuck.

In operation, the jaws are first set to receive the pulley-rim or other thin cylindrical work in the recesses C. The jaws are then expanded until the seats *m* bear against the inside surface of the work. The set-screws are next screwed down firmly onto the exterior surface of the work, thereby clamping the same securely on the seats. The pressure exerted by the screws, therefore, does not spring or distort the work from its cylindrical form. When a pulley or other thin cylindrical piece is held between the jaws of an ordinary chuck, the work bends or yields under the pressure of the jaws, and cannot be secured therein as firmly as desired.

With my improved jaw a pulley may be fastened to a chuck as firmly as if bolted thereto. This improvement does not materially increase the cost of the chuck, and may be embodied in various styles of chucks other than that shown. In large chucks two or more notches may be recessed in the jaw at different distances from the center, when required.

I claim as new and desire to secure by Letters Patent—

A lathe-chuck comprising in combination a series of jointly-operating radial jaws, each provided, in addition to its inner clamping end, with a transverse notch, and a set-screw working into each notch, whereby the device is convertible either for chucking pulleys or rings in the notches or for holding work in the ordinary manner, substantially as described.

WILLIAM L. SWEETLAND.

Witnesses:
JULIUS TWISS,
GEORGE L. BARNES.